US008641489B2

(12) United States Patent
Dubief et al.

(10) Patent No.: US 8,641,489 B2
(45) Date of Patent: Feb. 4, 2014

(54) AIR CONDITIONING DEVICE FOR A VEHICLE COMPRISING A NETWORK OF DE-ICING DUCTS

(75) Inventors: Flavien Dubief, Montigny le Bretonneux (FR); Cyrille Pateyron, Chatou (FR)

(73) Assignee: Renault S.A.S., Boulogne Billancourt (FR)

( * ) Notice: Subject to any disclaimer, the term of this patent is extended or adjusted under 35 U.S.C. 154(b) by 1109 days.

(21) Appl. No.: 12/519,445

(22) PCT Filed: Dec. 4, 2007

(86) PCT No.: PCT/EP2007/063257
§ 371 (c)(1),
(2), (4) Date: Sep. 1, 2009

(87) PCT Pub. No.: WO2008/074630
PCT Pub. Date: Jun. 26, 2008

(65) Prior Publication Data
US 2010/0035533 A1    Feb. 11, 2010

(30) Foreign Application Priority Data
Dec. 19, 2006 (FR) .................................. 06 55620

(51) Int. Cl.
*B60S 1/54* (2006.01)
(52) U.S. Cl.
USPC ............ 454/127; 454/121; 454/124; 454/126
(58) Field of Classification Search
USPC .................................. 454/121, 124, 126, 127
See application file for complete search history.

(56) References Cited

U.S. PATENT DOCUMENTS

| 4,637,298 | A | * | 1/1987 | Yoshikawa et al. | ............ 454/127 |
| 5,980,379 | A | * | 11/1999 | Shibata et al. | ................ 454/127 |
| 6,431,257 | B1 | * | 8/2002 | Sano et al. | ...................... 165/42 |
| 2001/0039178 | A1 | * | 11/2001 | Elliot | ............................ 454/121 |
| 2003/0060154 | A1 | * | 3/2003 | Colinet | ......................... 454/121 |
| 2003/0157877 | A1 | * | 8/2003 | Butera et al. | .................. 454/121 |
| 2004/0203333 | A1 | | 10/2004 | Yeon | |
| 2007/0293134 | A1 | * | 12/2007 | Shimada et al. | .............. 454/121 |

FOREIGN PATENT DOCUMENTS

FR       2 876 958       4/2006
WO    03 078187          9/2003

* cited by examiner

*Primary Examiner* — Steven B McAllister
*Assistant Examiner* — Jamil Decker
(74) *Attorney, Agent, or Firm* — Oblon, Spivak, McClelland, Maier & Neustadt, L.L.P.

(57) ABSTRACT

A distribution housing including an upstream portion and a widened downstream portion along the transverse axis relative to the upstream portion, in which an air inlet formed in the upstream portion is adapted to correspond to an outlet of an air conditioning apparatus, first and second outlets formed in the downstream portion are respectively adapted to correspond with a duct network for distributing blown air towards a de-icing board and side louvers, first pipes connect the inlet to the first outlets and extend between separation walls of the ducts and side walls of the housing, and a second pipe connects the inlet to the second outlet and extends at least partially between the duct separation walls. The second pipe opens, on the air inlet side, at the center of the air inlet, and the first pipes open on both sides of the first pipe. The housing has a different profile along the plane between the first and second pipes.

14 Claims, 5 Drawing Sheets

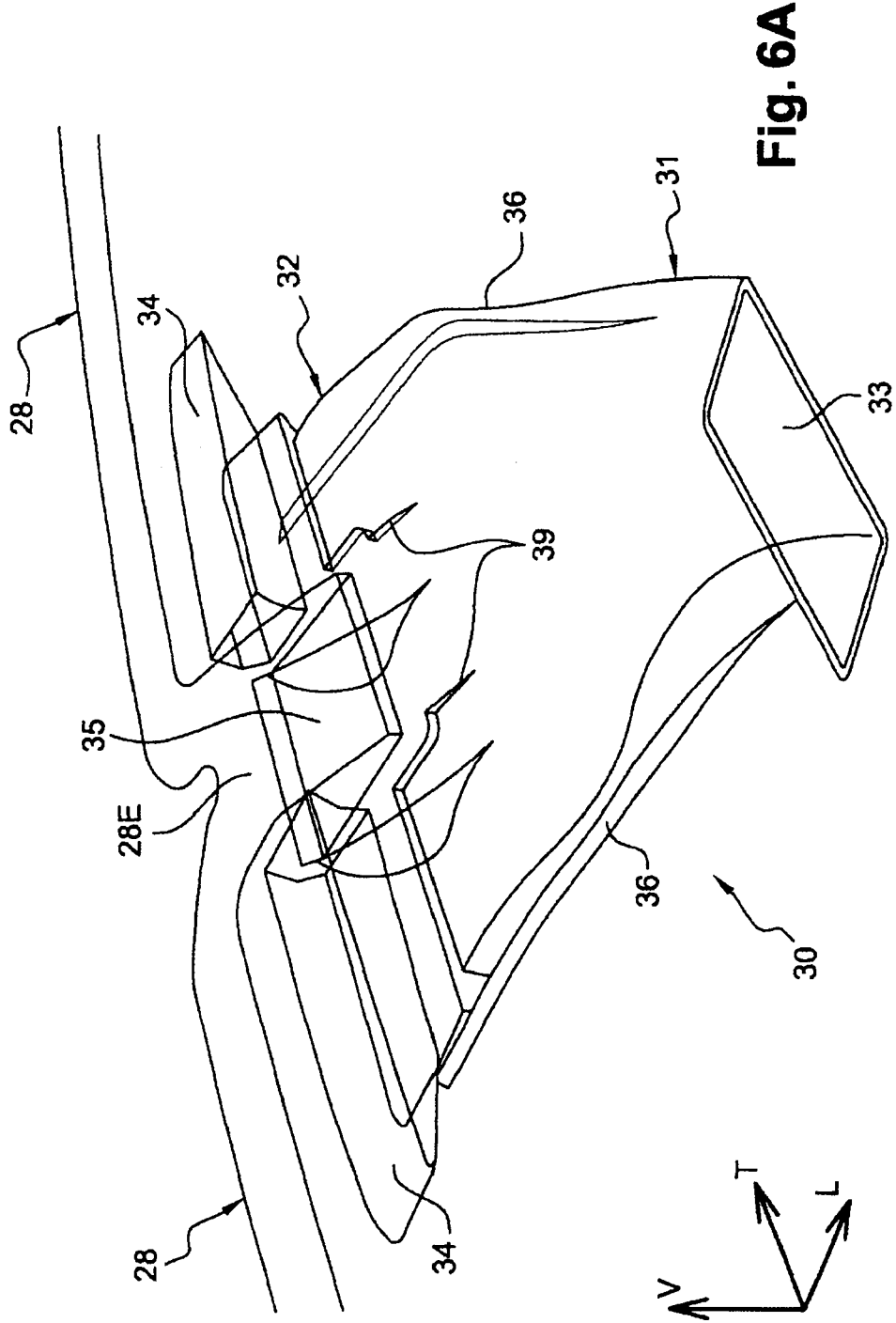

AIR CONDITIONING DEVICE FOR A VEHICLE COMPRISING A NETWORK OF DE-ICING DUCTS

BACKGROUND

The present invention relates to an air conditioning device of a vehicle comprising a network of defrosting ducts in an instrument panel.

It relates in particular to such a device in which the network comprises a distribution housing which has a downstream portion and an upstream portion and wherein:
  an air inlet is adapted to correspond with a defrosting opening of an air conditioning apparatus,
  first outlets are adapted to correspond with a windshield defrosting frieze,
  a second outlet is adapted to correspond with side defrosting outlets,
  first pipes connect the inlet to the first outlets, and extend between duct-separating walls and side walls of the housing,
  a second pipe connects the inlet to the second outlet, and extends at least partly between the duct-separating walls,
  the second pipe leads, on the air inlet side, to the center of the air inlet, and
  the first pipes lead to either side of the second pipe.

DESCRIPTION OF THE RELATED ART

Such a device is described in document FR2876958, in which a separation is made between a central duct and two distinct side ducts in order to allow a better distribution of the air flow over the extent of a windshield defrosting frieze and an improvement of the defrosting of the side windows by blowing an air flow through side outlets.

However, this device is not entirely satisfactory because considerable pressure losses appear that are caused by swirling separations, making the air speed in the ducts unequal. Moreover, the central zone of the windshield defrosting frieze is then insufficiently supplied with air. Finally, resistances to the flow hamper the flow of air toward the side ducts, rendering the defrosting of the side windows insufficient.

BRIEF SUMMARY

The object of the invention is to propose a distribution housing for an air conditioning device of a vehicle comprising a network of defrosting ducts in an instrument panel which no longer has the abovementioned disadvantages.

The subject of the invention is a distribution housing which furthermore complies with the aforementioned preamble having a differentiated profile on the plane L-V between the first pipe (340) and second pipe (350).

According to particular embodiments, the distribution housing comprises one or more of the following features:
  the downstream portion of the second pipe comprises a first wall and a second wall which extend sideways between the duct-separating walls, these walls being substantially parallel with one another, and extending generally in a rectilinear manner, so as to limit the resistance to the air flow emitted by the air conditioning apparatus;
  the first outlets are two in number and are placed laterally around the second outlet, each pipe corresponding with an orifice of the frieze, the frieze comprising two distant orifices;
  the first pipes have an S-shaped profile in the plane L-V;
  a baffle is placed, in the second pipe, at the front walls of the side ducts, this baffle having a convexity toward the upstream that is substantially half-way between the duct-separating walls in order to guide the air flow toward the side outlets;
  a baffle is placed, in the second pipe, at the front walls of the side ducts, this baffle comprising an additional orifice for the defrosting of the central zone of the windshield, and convexities toward the upstream around this additional orifice, in order to guide the air flow toward the side outlets;
  an additional orifice extends between the additional duct walls placed in the second pipe, the air destined for the side outlets passing on either side of the additional orifice, between the duct-separating walls and side baffles which extend between the upstream ridges of the additional duct walls and the front wall of the side ducts;
  the side baffles have a curved shape in order to limit the resistance to the air flow toward the side outlets;
  the duct-separating walls and/or the additional duct walls can be moved in translation and/or in rotation so as to change the proportion of air flow between the outlets of the distribution housing;
  the distribution housing is formed of a first element and a second element which forms a cover, at least one of them supporting a seal.

A further subject of the invention is an air conditioning device for a vehicle comprising a network of defrosting ducts in an instrument panel, said network comprising a distribution housing according to the invention which has a downstream portion corresponding with a network of ducts in order to distribute the air blown toward a defrosting frieze and side outlets, and an upstream portion corresponding with an outlet of an air conditioning apparatus.

The invention also relates to a vehicle comprising an air conditioning device according to the invention fitted into the instrument panel of the vehicle so that the air emitted by the air conditioning apparatus travels to the windshield frieze and to the side outlets.

BRIEF DESCRIPTION OF THE DRAWINGS

Other features and advantages of the invention will clearly appear on reading the following description of the nonlimiting embodiment of the latter, with reference to the appended drawings in which:

FIG. 6A is a three-quarter top and rear view in perspective of the network of ducts and of the side ducts.

DETAILED DESCRIPTION

In the following description, the direction designated L is the longitudinal direction corresponding to the axis of travel of a vehicle, the direction designated T is transverse, the direction designated V is vertical. The axis L is oriented from the front to the rear of the vehicle, the axis T from left to right and the axis V from bottom to top. Furthermore, the elements will be designated according to their position in the air flow, the air therefore passing by elements called "upstream" before passing by elements called "downstream".

Figure 1:
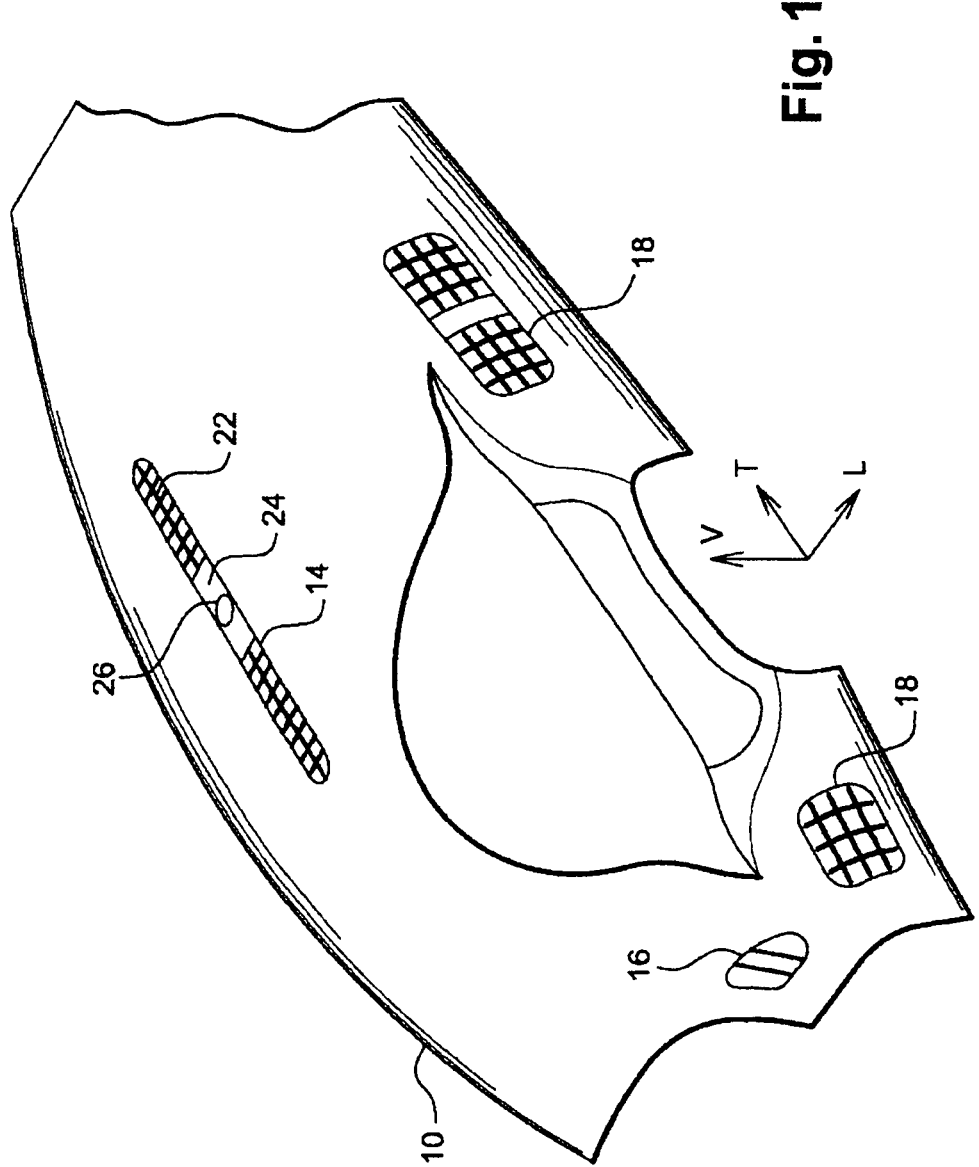
FIG. 1 is a three-quarter top and rear view in perspective of an instrument panel adapted to receive a device according to the invention.

Conventionally, as shown in FIG. 1, a motor vehicle is fitted with a driving position comprising an instrument panel 10 and an air conditioning apparatus hidden from the view of a user by the instrument panel 10. The air conditioning apparatus is designed to deliver air to the passenger compartment, heated if necessary, and even cooled in certain cases.

For the defrosting or demisting of the windshield, the air comes out into the passenger compartment through a defrosting frieze 14 arranged in the instrument panel 10. In this context a frieze, also referred to as a strip, is a wide central opening. For the defrosting or demisting of the front side windows, the air comes out into the passenger compartment through side outlets 16 arranged in the instrument panel 16.

The defrosting frieze 14 and the side outlets 16 are connected to the air conditioning apparatus by means of a network of ducts. In particular, they are connected to a single defrosting outlet through which provision is made for the apparatus to deliver the air intended for defrosting or demisting.

Air vents 18 are also arranged in the instrument panel 10 for the comfort of the occupants. The air vents 18 are also connected to at least one air vent opening of the air conditioning apparatus via pipes.

Here, the defrosting frieze 14 is placed substantially in the middle of the windshield. It extends in the transverse direction. In the example shown, the length of the frieze represents substantially a quarter to a third of the transverse extent of the panel. In order to optimize the air flow onto the windshield, the frieze 14 comprises two orifices 22 that are transversely distant from one another. The orifices 22 are each furnished with a grille. The distinct, independent, separated and transversely offset orifices 22 make it possible, while having a central frieze, to correctly distribute the blowing of air in the zones of the windshield through which the driver must be able to see to drive.

A transverse cover 24 separates the grilles. In the example shown, the cover 24 delimits a hole in correspondence with a sunlight sensor 26, the measurement of which sunlight is used by the air conditioning apparatus.

A distance of approximately sixty to seventy centimeters separates the outlets 16 from the middle of the opening 20 of the apparatus while a distance of ten to twenty centimeters separates the opening 20 from the frieze 14. The section of the pipes connecting the opening 20 to the outlets 16 is different from that of the pipes connecting the opening 20 to the openings 22 of the frieze 14. The pressure loss in the pipes connecting the opening 20 to the outlets 16 is different from that in the pipes connecting the opening 20 to the openings 22 of the frieze 14.

The rate of air flow for the defrosting function must be substantially distributed in the following manner: 60% to 90% for the frieze 14, 5% to 20% for each of the outlets 16, since, in the example described, the distance between the frieze and the zones of the windshield to be defrosted is substantially equal to the distance between each outlet and the corresponding side window.

Figure 2:
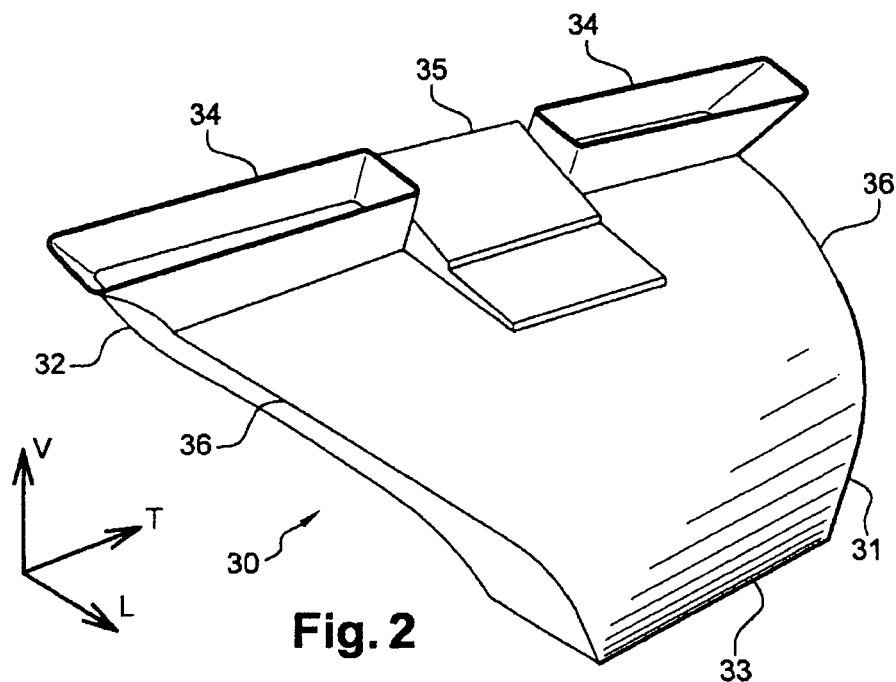
FIG. 2 is a three-quarter rear view in perspective of a distribution housing according to the invention.
Figure 3:
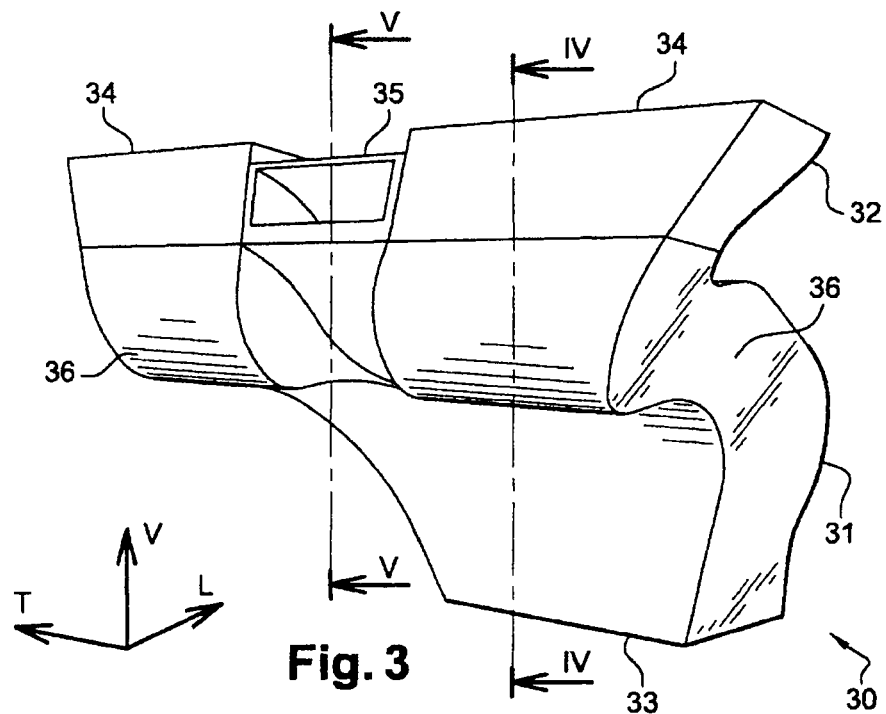
FIG. 3 is a three-quarter front view in perspective of the housing of FIG. 2.

FIGS. 2 and 3 represent a distribution housing 30 for the air flow generated by the air conditioning apparatus.

It is possible to distinguish two portions of this distribution housing 30, a first portion called the upstream portion 31 and a second portion called the downstream portion 32. Usually, this distribution housing 30 is placed in the instrument panel 10 substantially vertically, such that the upstream portion 31 may be designated as lower and the downstream portion 32 may be designated as upper.

In its upstream portion 31, the distribution housing 30 has an inlet 33 which interacts with an outlet of the air conditioning apparatus.

In its downstream portion 32, the distribution housing 30 has first outlets 34 and a second outlet 35.

The first outlets 34 are placed in the upper portion 32 of the housing 30, laterally on either side of the second outlet 35 and cooperate with ducts of the frieze 14 of the windshield.

The second outlet 35 is placed generally in the center of the upper portion 32 of the distribution housing 30 and interacts with side ducts 28 which make it possible to carry the air to the side outlets 16.

Generally, on a plane V-T, the distribution housing has a flared shape delimited by side walls 36, the dimensions of the inlet orifice 33 being reduced relative to the dimensions of all of the first outlets 34 and the second outlet 35 situated in the upper portion 32.

The distribution housing 30 is substantially symmetrical relative to the plane L-V passing through the center of the second outlet 35.

The distribution housing 30 has a differentiated profile along this plane L-V between a central zone and the side zones of the housing 30, and in particular the profiles of the first walls and second wall which extend sideways between the side walls 36 of the housing. These first and second walls extend substantially parallel with one another.

Figure 4:
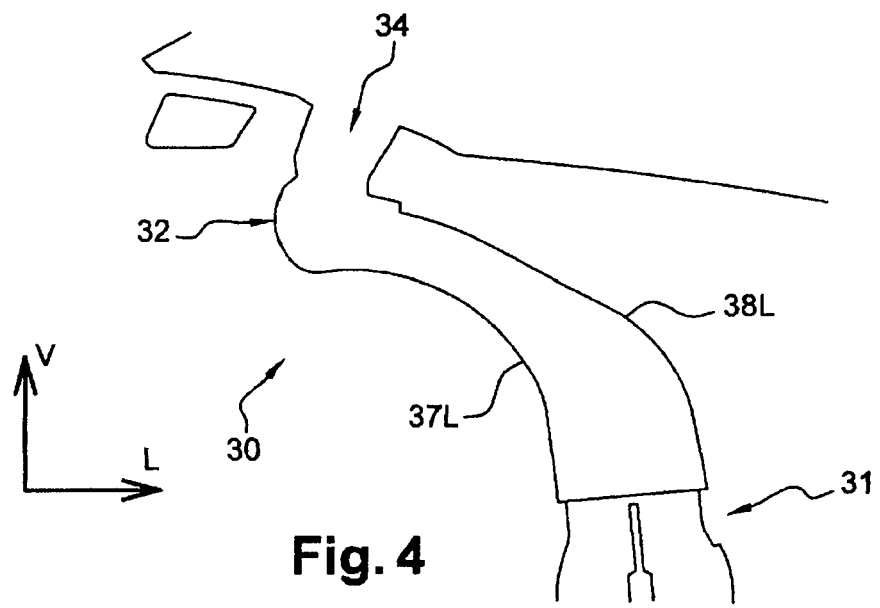
FIG. 4 is a view in section of the housing of FIG. 3 along the section IV-IV.

FIG. 4 shows a section of the distribution housing 30 at one of its side zones, along the axis IV-IV. In the side zones, the first walls 37L and second wall 38L have an S-shaped profile with a first and a second curvature.

The first curvature extends generally in the upstream or lower portion 31 of the housing 30. This curvature forms a concavity on the outer face of the first wall 37L, which, when the housing 30 is situated in the instrument panel 10, is placed in front of the second wall 38L.

The second curvature extends generally in the downstream or upper portion 32 of the housing 30. This curvature forms a concavity on the outer face of the second wall 38L, which, when the housing 30 is situated in the instrument panel 10, is placed above the first wall 37L.

The first curvature makes it possible to carry the air to the front and the upper portion of the instrument panel 10 from the air conditioning apparatus which is usually situated in the lower portion and behind the instrument panel 10.

The second curvature makes it possible to carry the air to the first outlets 34 and to direct the air flow toward the defrosting frieze 14.

The radii of the first and second curvatures are adapted to limit the pressure losses.

Figure 5:
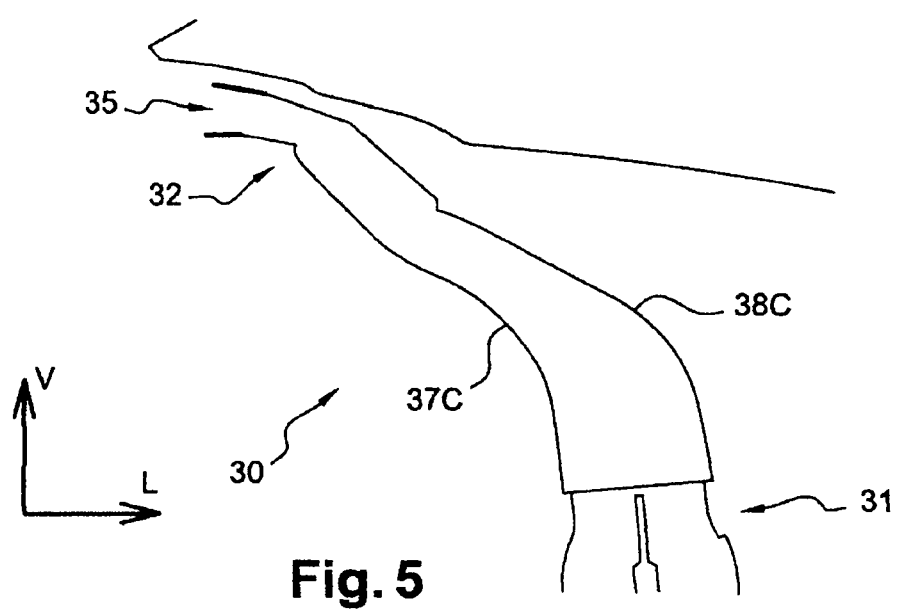
FIG. 5 is a view in section of the housing of FIG. 3 along the section V-V.

FIG. 5 shows a section of the distribution housing at the central zone along the axis V-V and in particular at the first walls 37C and second wall 38C of the distribution housing 30.

In this central zone and in its upstream portion 31, the distribution housing 30 has a curvature similar to the first curvature formed in the side zones but differs in its downstream portion 32.

In this portion 32, the first wall 37C and second wall 38C extend generally parallel and in a rectilinear manner relative to one another. When the housing 30 is situated in the instrument panel 10, the first wall 37C is situated beneath the second wall 38C.

This downstream portion 32 of the distribution housing 30 is in its central zone, with no chicane or other obstacle to flow and makes it possible to increase the air flow to the side ducts 28 and therefore to the side outlets 16.

During the use of a distribution housing according to document FR2876958, the air flow is distributed at substantially approximately 85% for the windshield frieze, also distributed between the driver and the passenger, and approximately 7.5% on each side outlet. With a distribution housing 30 according to the invention, a relative increase of between 15 and 30% of the air flow is obtained in the side outlets 16.

FIG. 6A shows the positioning of the side ducts 28 on the distribution housing 30. These side ducts 28 have a common inlet 28E which interacts with the second outlet 35 of the distribution housing 30 and two portions which extend sideways on either side of the housing 30 toward the side edges of the instrument panel 10 until they emerge at the side outlets 16.

In its upper portion 32, the distribution housing 30 has duct-separating walls 39.

The first, side, pipes 34 are then delimited by the first wall 37L and second wall 38L in the plane V-L and by the side walls 36 and the duct-separating walls 39 of the housing 30 in the plane V-T, and extend to the first outlets 34.

The second, central, pipe 35 is then delimited by the first wall 37L and second wall 38L in the plane V-L and by the duct-separating walls 39 of the housing 30 in the plane V-T, and extends to the second outlet 35.

The flow is then divided into three pipes, first side pipes 34 being two in number and a second single central pipe 35.

Figure 6B:
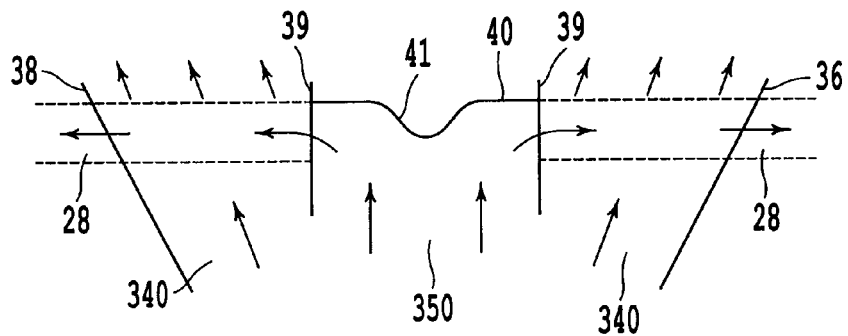
FIG. 6B is a diagram showing the air flow in the pipes according to a first embodiment.

FIG. 6B shows schematically the air flows travelling in the various pipes of the distribution housing 30 according to a first embodiment.

According to this first embodiment, the duct-separating walls 39 extend, from upstream to downstream, substantially parallel with one another.

At the outlet to the side ducts 28, the second central pipe 350 comprises a baffle 40 which extends sideways between the duct-separating walls 39 at the front walls of the side ducts 28. The purpose of this baffle 40 is to divide, in a substantially equal manner, the central air flow to the side ducts 28. According to this first embodiment, the flow is divided by a convexity 41 directed downstream placed substantially half-way between the two duct-separating walls 39.

Advantageously, the ridges of the convexity 41 are rounded in order to optimize the flow of air.

Since the flow is separated into two portions as far downstream as possible, the duct-separating walls 39 can be brought closer together which arranges an additional space for directing the flow. Furthermore, bringing the walls 39 closer together makes it possible to increase the size of the first side pipes 340 and consequently the air flow onto the windshield.

Consequently, the radius of curvature of the trajectory of the flow is reduced, the flow of the air is less constricted, the pressure loss is reduced, which makes it possible to increase the air flow captured in the side ducts 28.

Figure 7:
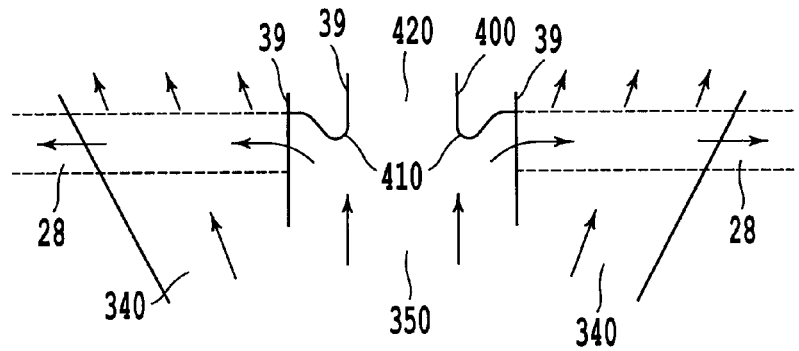
FIG. 7 is a diagram showing the air flow in the pipes according to a second embodiment.

FIG. 7 shows schematically the air flows travelling in the various pipes of the distribution housing 30 according to a second embodiment.

This second embodiment differs from the first by the change in the baffle 400 placed in the second central pipe 350. The baffle 400 has an additional air-passage orifice 420 situated substantially half-way between the two duct-separating walls 39 and around which two convexities 410 in the upstream direction are formed.

Advantageously, the ridges of the convexities 410, 411 are rounded to optimize the flow of air.

The additional orifice 420 interacts with an additional windshield defrosting duct. This additional duct makes it possible to defrost the windshield in its central portion.

By virtue of this additional orifice 420, the air flow on the windshield is better distributed than in the first embodiment, the air flow on the windshield coming from the first two side pipes 34 but also from the additional central duct 421.

Figure 8:
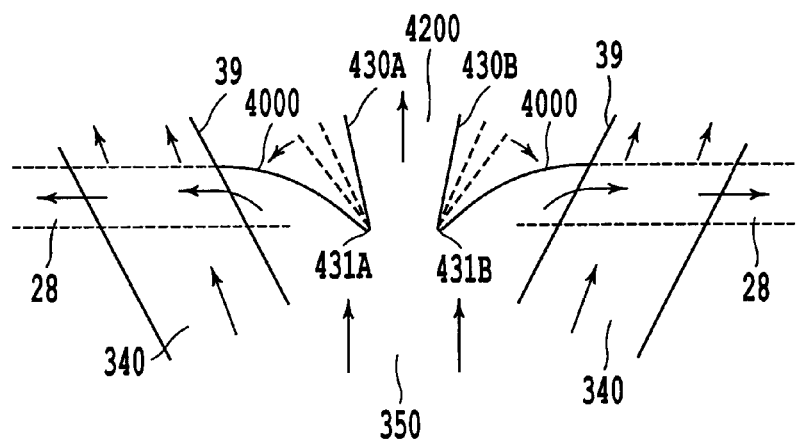
FIG. 8 is a diagram showing the air flow in the pipes according to a third embodiment.

FIG. 8 shows schematically the air flows travelling in the various pipes of the distribution housing 30 according to a third embodiment.

According to this embodiment, the dimensions of the first side pipes 36 are reduced to the detriment of the first central pipe 350 by a transverse positioning of the duct-separating walls 39 closer to the side walls 36 of the housing 30 than in the first two embodiments. The duct-separating walls 39 form an angle approaching the angles of the side walls 36 of the housing 30.

The second central pipe 350 accommodates an additional widened duct 4200. This additional duct 4200 is delimited by additional walls 430A, 430B. The duct-separating walls 39 and the additional walls 430A, 430B extend over a substantially equal length.

Curve-shape baffles 4000 connect the upstream ridges 431A, 431B of the additional walls 430A, 430B to their respective side ducts 28. The curvature of these baffles 4000 makes it possible to direct the air flow in the side ducts 28 progressively in order to limit the pressure losses.

This embodiment is particularly suited to a defrosting frieze 14 in three portions, for defrosting of the windshield that is increased in its central portion.

As a variant, it is possible to provide that the upstream ridges 431A, 431B of the additional walls 430A, 430B are rounded so as to limit the resistances to the flow of air.

With reference to manufacture and assembly, the distribution housing 30 may be made in two elements: a first element 310 forming a duct and a second element 320 which is included in the instrument panel 10. The second element 320 then forms a cover to close off the housing 30 by inserting a seal between these two elements 310, 320.

Advantageously, if the profile of the faces of the elements is not very angular, a simple straight seal may be bonded to at least one of the elements 310, 320 in order to achieve the seal.

According to a first variant embodiment, the duct-separating walls 39 and/or the additional duct walls 430A, 430B can be moved in translation and/or in rotation so as to change the proportion of the air flow between the outlets of the distribution housing 30. As shown in FIG. 8, dotted lines represent the position of walls 430 as they may be rotated.

According to a second variant embodiment, the second central pipe 350 directing the air to the second outlet 35 situated in the center of the distribution housing 30 may be formed by an element independent of the other elements of the housing 30.

According to a third variant embodiment, ribs for guiding the air may be placed on the front inner wall of the upstream portion of the housing 30 in order to increase the air flow travelling in the second central pipe 350.

The invention claimed is:

1. A distribution housing including an upstream portion and a downstream portion that is widened, on a transverse axis, relative to the upstream portion, comprising:
    an air inlet formed in the upstream portion and adapted to correspond with an outlet of an air conditioning apparatus;

first outlets and a second outlet formed in the downstream portion and respectively adapted to correspond with a duct network for distributing air blown toward a defrosting strip and side outlets;

first ducts that connect the inlet to the first outlets, and that extend between duct-separating walls and side walls of the housing;

a second duct that connects the inlet to the second outlet, and that extends at least partly between the duct-separating walls;

wherein the second duct leads, on the air inlet side, to a center of the air inlet;

wherein the first ducts lead to either side of the second duct;

wherein a transverse plane comprises a vector in a vertical direction from a bottom of the housing to a top of the housing, and comprises a vector in a longitudinal direction from a front of the housing to a rear of the housing, wherein the first ducts have an s-shaped profile in the transverse plane which differs from a profile of the second duct in the transverse plane;

wherein the first outlets are in a first plane, the second outlet is in a second plane, and wherein the first plane is substantially perpendicular to the second plane.

2. The housing as claimed in claim 1, wherein the downstream portion of the second duct comprises a first wall and a second wall that extend sideways between the duct-separating walls, these walls being substantially parallel with one another, and extending generally in a rectilinear manner, so as to limit resistance to the air flow emitted by the air conditioning apparatus.

3. The housing as claimed in claim 2, wherein the first outlets are two in number and are placed laterally around the second outlet, each duct corresponding with an orifice of the strip, the strip comprising two distant orifices.

4. The housing as claimed in claim 1, wherein a baffle is placed, in the second duct, at front walls of the first ducts, the baffle having a convexity toward the upstream portion of the distribution housing that is substantially half-way between the duct-separating walls to guide the air flow toward the side outlets.

5. The housing as claimed in claim 1, wherein a baffle is placed, in the second duct, at front walls of the first ducts, the baffle comprising an additional orifice for defrosting of a central zone of a windshield, and convexities toward the upstream around this additional orifice, to guide the air flow toward the side outlets.

6. The housing as claimed in claim 1, wherein an additional orifice extends between additional duct walls placed in the second duct, air destined for the side outlets passing on either side of the additional orifice, between the duct-separating walls and side baffles that extend between the upstream ridges of the additional duct walls and a wall of the first ducts.

7. The housing as claimed in claim 6, wherein the side baffles have a curved shape to limit resistance to the air flow toward the side outlets.

8. The housing as claimed in claim 1, wherein the duct-separating walls and/or additional duct walls can be moved in translation and/or in rotation so as to change a proportion of air flow between the outlets of the distribution housing.

9. The housing as claimed in claim 1, formed of a first element and a second element that forms a cover, at least one of the first and second elements supporting a seal.

10. A vehicle, comprising:
a housing as claimed in claim 1, the housing being fitted into a instrument panel so that air emitted by an air conditioning apparatus travels to a windshield strip and to the side outlets.

11. The housing as claimed in claim 1, wherein a percentage of total inlet air routed to the strip is within 60 to 90%, and a percentage of the total inlet air routed to the side outlets is within 5 to 20% for each side outlet.

12. The housing as claimed in claim 1, wherein a distance between the strip and zones of windshield to be defrosted is substantially equal to a distance between each side outlet and corresponding side windows.

13. The housing as claimed in claim 1, wherein the S-shape profile of the first ducts has a first concave curvature in the upstream portion of the housing, and a second concave curvature in the downstream portion of the housing.

14. The housing as claimed in claim 13, wherein radii of curvature of the first and second curvatures are adapted to limit pressure losses.

* * * * *